United States Patent
Leveque et al.

(10) Patent No.: US 8,575,808 B2
(45) Date of Patent: Nov. 5, 2013

(54) ELECTRIC MOTOR COMPRISING AN INDUCTOR WITH A SUPERCONDUCTING ELEMENT INCORPORATED BETWEEN COILS

(75) Inventors: Jean Leveque, Ceintrey (FR); Denis Netter, Nancy (FR); Abderrezak Rezzoug, Villers les Nancy (DE)

(73) Assignee: Universite de Lorraine, Nancy Cedex (FR)

( * ) Notice: Subject to any disclaimer, the term of this patent is extended or adjusted under 35 U.S.C. 154(b) by 449 days.

(21) Appl. No.: 12/808,716

(22) PCT Filed: Dec. 16, 2008

(86) PCT No.: PCT/EP2008/067605
§ 371 (c)(1),
(2), (4) Date: Jan. 18, 2011

(87) PCT Pub. No.: WO2009/077522
PCT Pub. Date: Jun. 25, 2009

(65) Prior Publication Data
US 2011/0278979 A1    Nov. 17, 2011

(30) Foreign Application Priority Data
Dec. 18, 2007 (FR) .................................. 07 59915

(51) Int. Cl.
*H02K 23/02* (2006.01)

(52) U.S. Cl.
USPC .......................................... 310/180; 310/184

(58) Field of Classification Search
USPC .......................................... 310/184, 179, 180
See application file for complete search history.

(56) References Cited

U.S. PATENT DOCUMENTS 4,176,291 A * 11/1979 Rabinowitz ..................... 310/52
5,177,387 A * 1/1993 McMichael et al. ......... 310/90.5

FOREIGN PATENT DOCUMENTS

| DE | 4344287 C1 | 6/1995 |
| DE | 19847591 A1 | 5/2000 |
| JP | 2002-35694 A | 2/2002 |

OTHER PUBLICATIONS

Kovalev et al.: "HTS electrical machines with YBCO bulk and Ag-BSCCO plate-shape HTS elements: recent results and future deveopment," Physica C, 2001, pp. 34-39, XP002492630.
Strasser: "Magnetische Charakterisierung von Schmelztexturierten YBa2Cu3O7-x-Hochtemperatur-Supraleitern, Kapitel 4," Papierflieger, Clausthal-Zellerfeld, 1999, XP002492633. X.

* cited by examiner

*Primary Examiner* — Tran Nguyen
*Assistant Examiner* — Naishadh Desai
(74) *Attorney, Agent, or Firm* — Baker Hostetler LLP

(57) ABSTRACT

An electric motor includes a magnetic field induction device and an induced field device, rotating relative to one another, wherein the induction device comprises a set of two conducting coils around an axis, through which currents travel in the same direction, and a central part, placed between the two coils, comprising a superconducting element placed in a plane that is inclined relative to the axis of the coils, channeling the magnetic field produced by the coils on either side of the inclined plane.

15 Claims, 5 Drawing Sheets

ELECTRIC MOTOR COMPRISING AN INDUCTOR WITH A SUPERCONDUCTING ELEMENT INCORPORATED BETWEEN COILS

CROSS-REFERENCE TO RELATED APPLICATIONS

This application is a National Stage of International patent application PCT/EP2008/067605, filed on Dec. 16, 2008, which claims priority to foreign French patent application No. FR 07 59915, filed on Dec. 18, 2007, the disclosures of which are incorporated by reference in their entirety.

FIELD OF THE INVENTION

The field of the invention is that of electric motors and notably of power motors based on superconducting parts.

BACKGROUND OF THE INVENTION

In a known manner, the superconducting machines have the value of being able to be more compact, lighter and more efficient than the conventional machines.

A machine has already been proposed comprising an armature that is conventional in terms of rotor coupled to a static superconducting inductor based on a concentration of the magnetic field flux created. In this type of machine, the inductor can be kept static since it uses superconductivity properties requiring cryogenic means.

The inductor, as illustrated in FIG. 1A, consists of two solenoids in which opposite electric current $i_1$ and $i_2$ flow, generating magnetic fields $B_1$ and $B_2$ between the two solenoids $S_1$ and $S_2$. A set of several plates $P_i$ of superconducting material connect the two solenoids. The function of these plates and their orientation is to screen the normal component of the magnetic field and thus impose field lines between the plates.

In order to further improve the performance of this type of power electric motor by intensifying the magnetic field created, the present invention proposes an electric motor comprising a new type of inductor based on superconducting material.

SUMMARY OF THE INVENTION

More precisely, the subject of the present invention is an electric motor comprising a magnetic field induction device and an induced field device, rotating relative to one another, characterized in that the induction device comprises a set of two conducting coils around an axis, through which currents travel in the same direction, and a central part placed between the two coils, comprising a superconducting element, placed in a plane that is inclined relative to the axis of the coils, channeling the magnetic field produced by the coils on either side of the inclined plane.

According to a variant of the invention, one and the same current travels through the two conducting coils of the induction device.

According to a variant of the invention, the induction device comprises a monolithic part comprising a first coil at a first end, a second coil at a second end, the central part made of superconducting material being incorporated at the center of said monolithic part.

According to a variant of the invention, the monolithic part is a glass fiber having a slot into which the central part is inserted.

According to a variant of the invention, the conducting coils of the induction device are made of superconducting material.

According to a variant of the invention, the conducting coils of the induction device are made of material of the YBaCuO or BSCCO type.

According to a variant of the invention, the superconducting element of the central part is made of YBaCuO.

According to a variant of the invention, the central part comprises a substrate covered with a layer of superconducting material. Typically the thickness may be between approximately a few hundred nanometers and a few millimeters.

According to a variant of the invention, the motor of the invention also comprises cryogenic means in order to cool the central part.

Advantageously, these cryogenic means are of the Dewar flask type.

According to a variant of the invention, the induced device comprises at least one conducting coil set.

According to a variant of the invention, the induced device comprises at least three sets of conducting coils resulting in a three-phase system.

According to a variant of the invention, the induced device comprises at least three series of interlinked windings, each series being powered by one phase of a three-phase system.

According to a variant of the invention, the motor also comprises means for rotating the induced device.

According to a variant of the invention, the motor also comprises sliding contacts, for example brushes, making it possible to electrically connect the movable portion to a fixed power source.

BRIEF DESCRIPTION OF THE DRAWINGS

The invention will be better understood and other advantages will become evident on reading the following description given in a nonlimiting manner and by virtue of the appended figures amongst which.

DETAILED DESCRIPTION

Figure 1A:
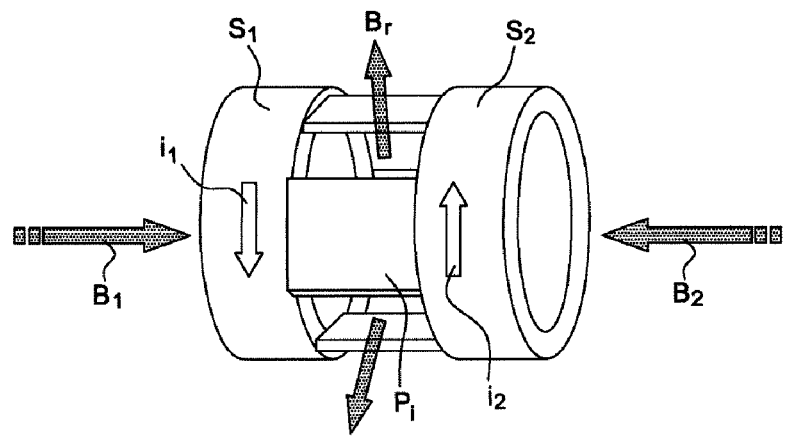
FIG. 1A illustrates an example of an inductor based on superconducting material according to the prior art.
Figure 1B:
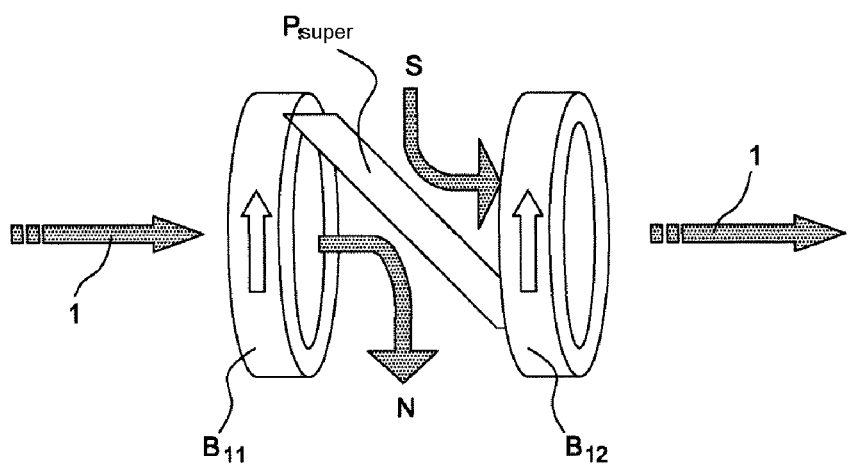
FIG. 1B illustrates the operating principle of a motor according to the invention.

FIG. 1B illustrates the operating principle of a motor according to the invention. More particularly, it illustrates the principle of production of the inductor. The inductor comprises at least two solenoids, or two coils, $B_{11}$, $B_{12}$, that are coaxial, through which a current travels which generates a magnetic field 1. The inductor also comprises a superconducting plate $P_{super}$. This superconducting plate, through its screening property, diverts on one face the magnetic flux induced by the first solenoid $B_{11}$ in a direction oriented substantially at 45° from the plane in which it is situated, and diverts on its other face the magnetic flux induced by the second solenoid $B_{11}$, in the same direction. The superconducting plate is inclined relative to the axis of the solenoids, for example by an angle substantially equal to 45°. A north pole N and a south pole S of a magnetic field are thus created in a direction substantially perpendicular to the axis of the solenoids. The diamagnetic property of a superconductor makes it possible to obtain a perfect, or virtually perfect, magnetic screen and thus obtain the spatial variation of the magnetic flux as illustrated by FIG. 1B. It is by virtue of this spatial variation that it is possible to create a magnetic field.

Figure 2:
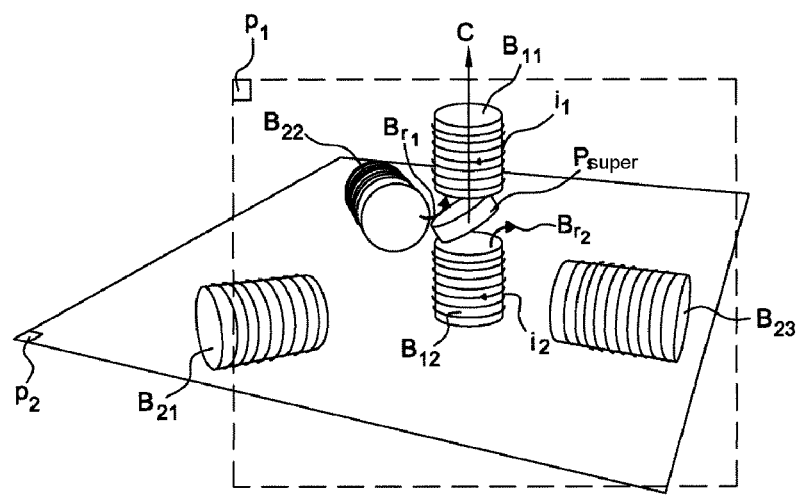
FIG. 2 schematizes an example of a motor according to the invention.

FIG. 2 shows in a simplified manner an exemplary embodiment of a motor according to the invention, in the case in which the armature produces a field rotating by means of a three-phase coil symbolized by three coils $B_{21}$, $B_{22}$, $B_{23}$. The invention may also apply in the case in which the rotating field is produced by a single-phase coil.

In a general manner, the electric motor of the invention operates on the principle of interaction of two magnetic fields.

According to the variant of the invention described below, an inductor powered in direct current creates a static magnetic field. It should be noted that the field could also be rotating with a rotating inductor.

As shown in FIG. 2, the proposed inductor therefore consists:
of two coils $B_{11}$ and $B_{12}$ around an axis C, in series making it possible to create a magnetic induction, through which electric currents travel in the same direction $i_1$ and $i_2$ and,
of a superconducting plate $P_{super}$ which, by its property of screening of the magnetic field, channels the field lines on either side of its surfaces. The resultant magnetic field $B_{r1}$ and $B_{r2}$ is represented by the black arrows in the diagram of FIG. 2.

The axes of the coils $B_{11}$, $B_{12}$ of the inductor are in a first plane $p_1$. The inductor is placed inside an armature symbolized by the three coils $B_{21}$, $B_{22}$, $B_{23}$ through which electric currents of a three-phase electric system travel and of which the axes are positioned in second plane $p_2$ perpendicular to said first plane.

The three coils secured in a conventional structure not shown in the diagram of FIG. 2 are the seat of an induced voltage. A relative rotary movement is therefore created between the armature and the inductor under the effect of this torque.

Conversely, it is just as possible to envision causing this rotating machine to function as a voltage generator by making provision to couple means for causing the armature to rotate, for example in which the coils are no longer powered.

More precisely and according to the invention, the inductor system comprises, in order to generate a high magnetic field, at least two coils wound round an element, incorporating a part made of superconducting material intended to allow the lines of magnetic field created by said coils to converge so as to generate a magnetic-field concentration and therefore create a particular intense magnetic field. The coils $B_{11}$ and $B_{12}$ advantageously consist of superconducting material.

The magnetic field thus induced can in return create, within the coils supplied with current, a rotation that makes it possible to operate the electric motor.

The superconducting materials make it possible to achieve levels of magnetic induction that cannot be had with conventional materials. In a conventional motor, the induction has an amplitude of 2 Teslas (from −1 T to +1 T). With this structure, it is possible to envision, as a minimum, doubling this value and consequently increasing the electromagnetic torque in the same proportions.

According to the invention, positioning the superconducting mass element on an oblique axis forming an angle of approximately 45° with the axis of the coils $B_{11}$ and $B_{12}$ makes it possible to additionally generate two resultant magnetic fields $B_{r1}$ and $B_{r2}$ and therefore to amplify performances relative to those obtained with the architectures of the prior art.

EXEMPLARY EMBODIMENT

The inductor may advantageously consist of a glass fiber comprising both the two coils and the superconducting plate. The value of the glass fiber lies notably in the low weight that it has and its temperature resistance. The conducting windings are advantageously also made of superconducting material of the NbTi type.

They can also be made of BiSrCaCuO or else of YBCO. Typically the diameter of the fiber can be approximately a few tens of millimeters. The superconducting plate incorporated into the glass fiber may, for its part, advantageously be made of YbaCuO and have a thickness of the order of a few millimeters. If a layer of superconducting material is deposited on a substrate, the thickness of this layer may typically be between approximately a few nanometers and a few micrometers.

The inductor thus produced is submerged in cryogenic means of the cryostat type. The cryostat may be mounted vertically.

The inductor can therefore be cooled to an operating temperature of less than 4.2 K by using liquid helium.

In general, cryogenic fluids are contained in specific receptacles called Dewar flasks in their simplest form. This consists of two flasks one inside the other usually separated by a vacuum or by an insulator and most frequently by an anti-radiation thermal screen. In almost all cases, the flasks are made of metal and rarely of glass or glass fiber.

The standard insulator for producing a superconducting motor is a vacuum, at least a secondary vacuum, and the walls of the flasks are metal. The second crucial point in the production of a cryostat is the anti-radiation screen. Its role is to reduce the losses through radiation between the cryogenic bath and the ambient air. The principle consists either in inserting a screen at an intermediate temperature between that of the bath and the ambient between the walls of the cryostat, or in using sheets of reflective aluminum. There are two types of screens:
the super insulator that is an aluminum sheet of several micrometers or tens of micrometers thickness, similar to a survival blanket, separated by an insulator. Between 20 and 40 layers of super insulator are stacked in the insulation vacuum without being compressed in order to prevent conduction through this screen;
a cooled screen is a metal wall inserted in the insulation vacuum, that is cooled by extracting units of heat from the vapors of the cryogenic bath at approximately 80K;
the quality of the insulation vacuum is crucial for the correct operation of the cryostat. One of the problems that is encountered is that of the degassing of the materials which, over time, release particles which damage the vacuum. For this, it is worthwhile using carefully degreased materials which do not naturally degas very much or placing in the vacuum a material that absorbs the particles. Otherwise, at low temperature, the degassing becomes virtually zero and it can be considered that, after having reached the boiling temperature of nitrogen, it disappears.

It should be noted that particular precautions in the assembly of the cryostat or of the parts under vacuum must be taken in order to prevent the possibility of air particles being trapped and being released inadvertently, for example during the operation of a superconducting motor, causing a loss of the vacuum which may itself cause a sudden transition of the superconducting windings.

In the motor of the invention, the inductor fitted with its cryogenic means is placed in a first plane perpendicular to a second plane, said second plane comprising coils forming the armature. According to the invention, the inductor comprising its cryogenic means is kept static while the device forming the armature is capable of rotating.

Advantageously, and according to another variant of the invention, the cryogenic means still being fixed, a rotating connection between a rotating inductor device and the cryogenic means can also be envisioned.

This device forming the armature comprises a set of at least three coils through which three-phase currents travel, produce at the geometric center of the assembly a field rotating at a speed equal to the pulsation of the currents. If each coil creates in this center a field of amplitude Bm, the sum of the three fields is represented by a vector of a constant amplitude, equal to 3 Bm/2.

The rotating magnetic field thus created can interact with the intense magnetic field created by the induction device in order to generate a magnetic torque.

EXEMPLARY EMBODIMENT OF A MOTOR ACCORDING TO THE INVENTION

Figure 3:
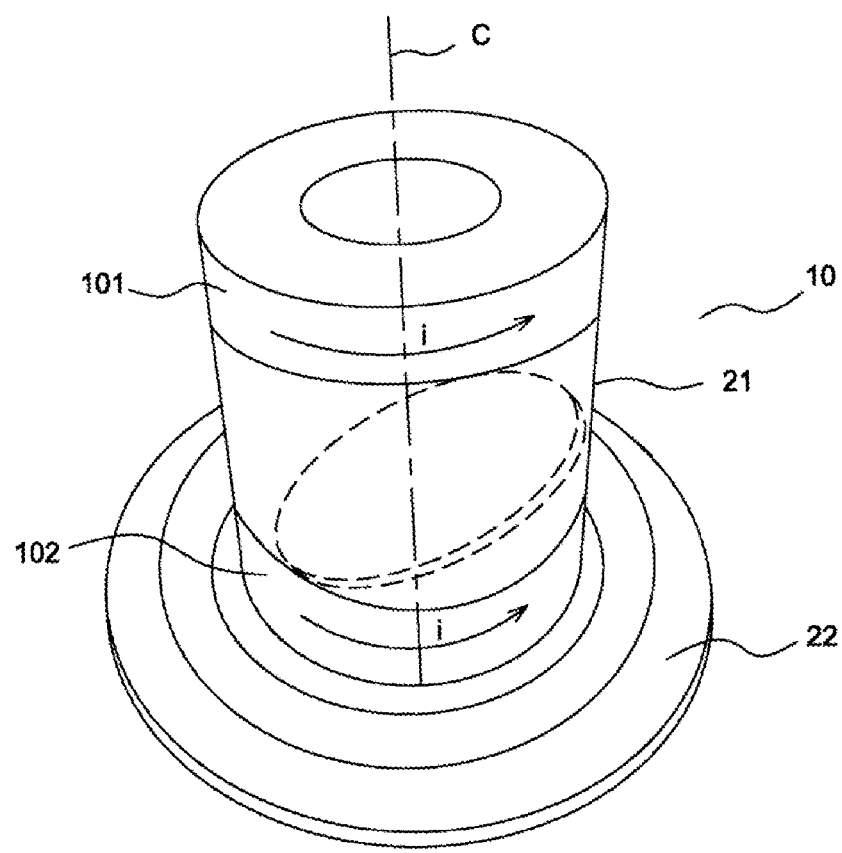
FIG. 3 illustrates an exemplary embodiment of a motor comprising and induction device fitted with cryogenic means according to the invention.
Figure 4:
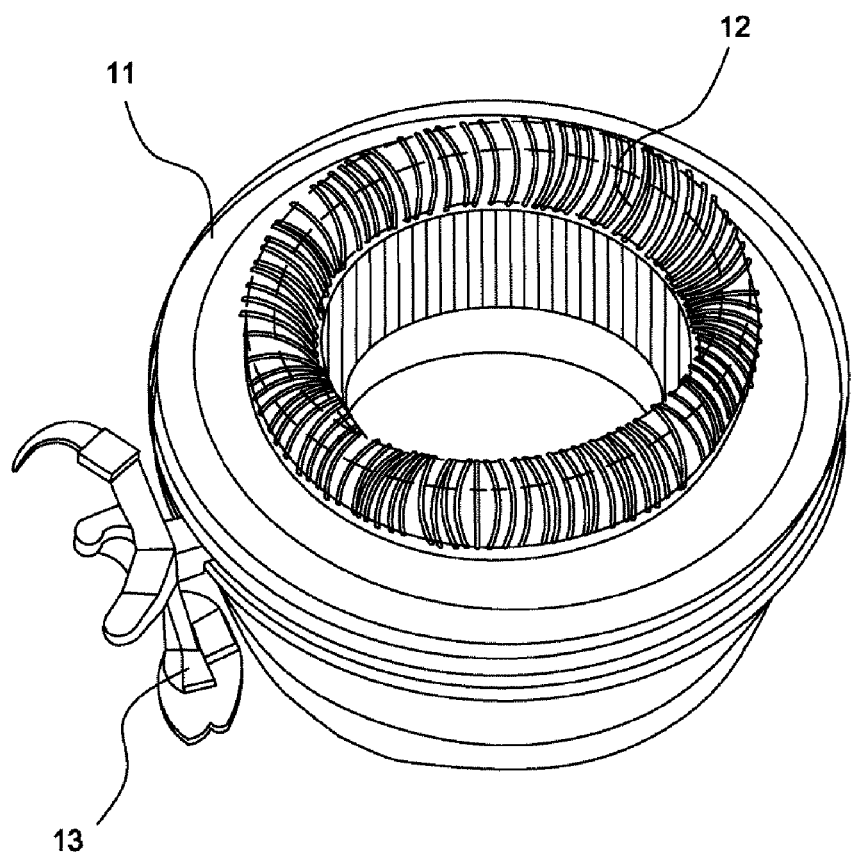
FIG. 4 illustrates an example of an induced field device used in a motor of the invention.
Figure 5:
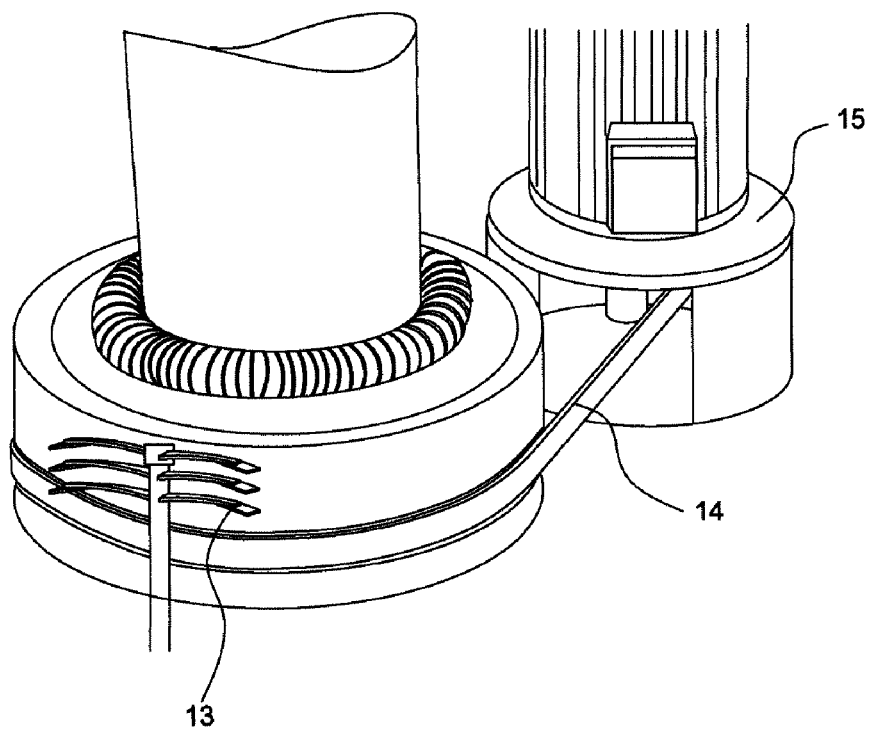
FIG. 5 illustrates an example of a motor according to the invention comprising means for rotating the induced device.

FIGS. 3, 4, 5 illustrate a possible embodiment of a rotating machine according to the invention showing the induction device (FIG. 3), the armature device (FIG. 4), and a view of the complete machine combining these two elements (FIG. 5).

In this example, the inductor 10 remains immobile; it is placed in the middle of a rotary coil set 11, the armature. Such an embodiment simplifies the application of the cooling of the inductor; specifically in this case, the cryogenic system may itself also remain immobile. As indicated above, the inductor comprises, for example, two coils 101, 102 through which a current travels in the same direction i and which are separated by the plate $P_{super}$ oriented at an angle of 45° relative to their common axis C. A cylindrical casing 21 and attachment means not shown make it possible, for example, to keep the superconducting plate fixed relative to the winding at the desired angle of orientation, 45° for example. A base 22 comprises, for example, all of the necessary electric connections to the coils for supplying them with current i.

The armature 11 therefore rotates about the inductor 10; conventionally it comprises three series of interlinked windings 12, each series being powered by one phase of a three-phase system. The number of windings corresponds to the number of magnetic poles of the inductor 10, in this instance two poles. A rotating magnetic field is then created inside the armature which interacts with the magnetic field produced by the inductor 10. The electromagnetic torque thus formed causes the armature to rotate.

A device of sliding contacts 13, for example brushes, makes it possible to electrically connect the windings 12 to a fixed power source.

The rotating machine may have a reversible operation. In a first operating mode, the armature is powered by a three-phase electric power system causing its rotary motion. It may, for example, be connected by a belt 14 in order to rotate a device 15, then having the function of an electric motor.

In the other operating mode, the armature is rotated, for example, by a secondary electric motor. In this case, the armature becomes a source of three-phase power.

The invention claimed is:

1. An electric motor, comprising:
a magnetic field induction device and an induced field device, the magnetic field induction device and the induced field device rotating relative to one another,
the induction device comprising a set of two conducting coils that are coaxial, through which currents travel in the same direction, and a superconducting element placed between the two conducting coils and placed in a plane that is inclined relative to an axis of the two conducting coils, said superconducting element channeling the magnetic field produced by the two conducting coils on either side of the inclined plane, one and the same current traveling through the two conducting coils.

2. The electric motor as claimed in claim 1, wherein the induction device further comprises a monolithic part comprising a first coil at a first end, a second coil at a second end, and a central part made of superconducting material being incorporated at the center of said monolithic part.

3. The electric motor as claimed in claim 1, wherein the superconducting central part is placed in an inclined plane forming an angle of approximately 45° with the axis of the two conducting coils.

4. The electric motor as claimed in claim 1, wherein the two conducting coils of the induction device are made of a superconducting material.

5. The electric motor as claimed in claim 4, wherein the two conducting coils of the induction device are made of material of YBaCuO or BsCCO type.

6. The electric motor as claimed in claim 2, wherein the superconducting material of the central part is made of YBaCuO.

7. The electric motor as claimed in claim 2, wherein the central part comprises a substrate covered with a layer of the superconducting material.

8. The electric motor as claimed in claim 7, wherein the thickness of the superconducting layer is between a few nanometers to a few micrometers.

9. The electric motor as claimed in claim 2, wherein the electric motor further comprises cryogenic means to cool the central part.

10. The electric motor as claimed in claim 9, wherein the cryogenic means are of Dewar flask type.

11. The electric motor as claimed in claim 1, wherein the induced field device comprises at least one conducting coil set.

12. The electric motor as claimed in claim 11, wherein the induced field device comprises at least three sets of conducting coils.

13. The electric motor as claimed in claim 12, wherein the induced field device further comprises three series of interlinked windings, each series of interlinked windings being powered by one phase of a three-phase system.

14. The electric motor as claimed in claim 13, wherein the electric motor further comprises sliding contacts, which electrically connect the interlinked windings to a fixed power source.

15. The electric motor as claimed in claim 14, wherein the sliding contacts comprise brushes.

* * * * *

UNITED STATES PATENT AND TRADEMARK OFFICE
CERTIFICATE OF CORRECTION

PATENT NO. : 8,575,808 B2  
APPLICATION NO. : 12/808716  
DATED : November 5, 2013  
INVENTOR(S) : Jean Leveque, Denis Netter and Abderrezak Rezzoug Page 1 of 1

It is certified that error appears in the above-identified patent and that said Letters Patent is hereby corrected as shown below:

Title Page:

For Item "(75) Inventors:"

Please replace the country on inventor Abderrezak Rezzoug from "(DE)" with --(FR)--.

Signed and Sealed this
Seventh Day of January, 2014

Margaret A. Focarino
*Commissioner for Patents of the United States Patent and Trademark Office*